US007860449B1

(12) United States Patent
Bowman

(10) Patent No.: US 7,860,449 B1
(45) Date of Patent: Dec. 28, 2010

(54) METHOD AND SYSTEM FOR DELIVERING CONTEXTUAL CONTENT TO A MOBILE DEVICE

(75) Inventor: Judson Shiers Bowman, Raleigh, NC (US)

(73) Assignee: Motricity, Inc., Bellevue, WA (US)

( * ) Notice: Subject to any disclaimer, the term of this patent is extended or adjusted under 35 U.S.C. 154(b) by 1218 days.

(21) Appl. No.: 11/294,233

(22) Filed: Dec. 5, 2005

(51) Int. Cl.
*H04H 40/00* (2008.01)
(52) U.S. Cl. ..................................... 455/3.06; 455/3.01
(58) Field of Classification Search ....... 455/3.01–3.06; 705/26; 709/217–219
See application file for complete search history.

(56) References Cited

U.S. PATENT DOCUMENTS

| 5,020,147 | A | * | 5/1991 | Okanobu ..................... 455/302 |
| 6,125,281 | A | * | 9/2000 | Wells et al. .................. 455/466 |
| 6,507,727 | B1 | | 1/2003 | Henrick |
| 6,584,613 | B1 | | 6/2003 | Dunn et al. |
| 7,149,541 | B2 | * | 12/2006 | Rautila ..................... 455/552.1 |
| 2002/0049975 | A1 | | 4/2002 | Thomas et al. |
| 2002/0112237 | A1 | | 8/2002 | Kelts |
| 2002/0124252 | A1 | | 9/2002 | Schaefer |
| 2002/0133405 | A1 | | 9/2002 | Newnam et al. |
| 2002/0133827 | A1 | | 9/2002 | Newnam et al. |
| 2002/0198003 | A1 | | 12/2002 | Klapman |
| 2003/0014754 | A1 | | 1/2003 | Chang |
| 2003/0033385 | A1 | * | 2/2003 | Yavitz ......................... 709/219 |
| 2003/0060157 | A1 | | 3/2003 | Henrick |
| 2003/0093814 | A1 | | 5/2003 | Birmingham |
| 2004/0038692 | A1 | | 2/2004 | Muzaffar |
| 2004/0049779 | A1 | | 3/2004 | Sjoblom et al. |
| 2004/0078274 | A1 | * | 4/2004 | Aarnio ......................... 705/26 |
| 2004/0117254 | A1 | | 6/2004 | Nemirofsky et al. |
| 2004/0139469 | A1 | | 7/2004 | Incentis Carro |
| 2004/0139474 | A1 | | 7/2004 | Carro |
| 2004/0186733 | A1 | * | 9/2004 | Loomis et al. .............. 704/278 |
| 2005/0003866 | A1 | | 1/2005 | Bechon et al. |
| 2005/0028189 | A1 | | 2/2005 | Heine et al. |
| 2005/0076393 | A1 | | 4/2005 | Sussman |

(Continued)

FOREIGN PATENT DOCUMENTS

WO WO2005/062613 7/2005

OTHER PUBLICATIONS

"Video Compression Transmission via FM Radio", Proceeding of SPIE, vol. 4391, 455(2001), Szu et al.*

*Primary Examiner*—Raymond S Dean
(74) *Attorney, Agent, or Firm*—Bradley Arant Boult Cummings, LLP; Nicholas J. Landau

(57) ABSTRACT

A system and methods for targeting mobile content to a mobile device based on the context of where and how a user discovers the content. Instead of advertising content during commercial breaks of a television program, the invention contextually targets the mobile content to specific program content (e.g., music video) as it is being broadcast in the form of a screen pop-up containing text messaging instructions to obtain the mobile content concurrently with, or following the broadcast of the specific program content. Such "contextual targeting" leads to a significantly higher frequency and profitability of conversions and downloads. Similarly, the invention contextually integrates mobile content into a user's online experience using a web-enabled device in which the contextual content can be integrated with a search engine or a contextual link can be placed on web pages that are served to the user.

30 Claims, 13 Drawing Sheets

U.S. PATENT DOCUMENTS

| | | |
|---|---|---|
| 2005/0124290 A1* | 6/2005 | Bostrom et al. ............ 455/3.06 |
| 2005/0192025 A1 | 9/2005 | Kaplan |
| 2005/0221876 A1 | 10/2005 | Van Bosch et al. |
| 2005/0235324 A1 | 10/2005 | Makipaa et al. |
| 2006/0141962 A1* | 6/2006 | Forbes et al. ............. 455/186.1 |
| 2007/0047591 A1* | 3/2007 | Senthilnathan et al. ...... 370/503 |

\* cited by examiner

METHOD AND SYSTEM FOR DELIVERING CONTEXTUAL CONTENT TO A MOBILE DEVICE

FIELD OF THE INVENTION

The present invention relates generally to systems for wireless delivery of media content to mobile devices. More specifically, the present invention relates to wireless delivery of media contextual content to mobile devices that is relevant to media content streamed or served to a user concurrently.

BACKGROUND OF THE INVENTION

Downloads of content, particularly ringtones and games, have been a profitable means for obtaining additional revenue for mobile operators. Content for mobile devices has been sold to end users via dedicated storefronts. For example, content has been sold via a storefront available on the "wireless deck" (or portal) resident on Wireless Application Protocol (WAP)-enabled devices such as mobile or cellular phones when the user opens the wireless browser on the mobile device. Similar content has also been sold on dedicated web portals for downloadable content including polyphonic ringtones, graphics and games. An example of such a web portal is Zingy.com. Such content is typically organized according to various categories and taxonomies (e.g., entertainment, sports, etc.). They are sorted by device type and type of content, such as ringtones, graphics, games.

Premium text messaging allows the mobile customer to pay for content by receiving a text message and having the downloaded content billed on monthly cell phone bills. Jamster, which is a subsidiary of VeriSign, is one of the pioneers in selling mobile content via premium short message service (SMS) shortcodes in which Jamster purchases advertising on television networks and in magazines to promote a specific piece of mobile content. The user sends a text message to a shortcode, such as 75555, along with a promotional code from the advertisement. This text message sends a server request to Jamster, which then directs a Wireless Application Protocol (WAP) push message back to the user that, upon being clicked on and opened, facilitates device detection and triggers the download of the content to the mobile device.

The Wireless Application Protocol is a layered protocol making transmissions of WAP content possible over almost any available wireless network. These networks include those based on Global System for Mobile Communications (GSM), Code-Division Multiple Access (CDMA) and Cellular Digital Packet Data (CDPD) among other technologies. WAP-enabled devices include a microbrowser that enables content browsing at a web server that serves requested files in Wireless Markup Language (WML) to the WAP-enabled device via a WAP gateway. Unlike Hypertext Markup Language (HTML) that downloads a new HTML file with each link that is clicked on a web page, WML files contain a deck of pages each representing a separate screen.

There is a need for a mobile content delivery system and methods that can access (discover) and deliver media contextual content directly to a user's mobile device during a program broadcast or an interactive online session without the requirement for the user to access an electronic storefront that provides user-selected media content.

SUMMARY OF THE INVENTION

The present invention is directed to targeting of mobile content based on the context of where and how a user discovers the content. In the case of music videos played as part of a television program, rather than advertising content during commercial breaks, the present invention contextually targets the mobile content to the specific music video as it plays. This "contextual targeting" will lead to a significantly higher frequency of conversions and downloads. Similarly, mobile content can be contextually integrated into a user's online experience, either via an online experience on a computer or mobile device, in which links to the contextual mobile content can be integrated with a search engine or within the content of web pages. The relevance and integration of mobile content with online usages will lead to higher download rates.

Mobile content as used in the present invention refers to any content that can be delivered to a mobile device, including content that is downloaded or streamed. By way of example, mobile content includes, but is not limited to, ringtones, games, graphics, music (e.g., MP3 files), and video. Media contextual content as used herein refers to mobile content that is relevant to content received by a user through any electronic medium, including, but not limited to, a television, a set-top box, a computer, a handheld device and a mobile phone.

In one aspect of the invention, a method is provided for delivering media contextual content to a mobile device during a media stream broadcast. A media stream in the context of the present invention includes network television, cable television, and satellite transmissions of programming content including music videos, sporting events, news, or any other type of broadcast programming. A media stream broadcast is transmitted to a media stream receiver. During at least a portion of the media stream broadcast, a display on the television or other screen associated with the media stream receiver displays text instructions for enabling a viewer to request media contextual content during transmission of the media stream. A mobile content delivery platform receives a text message from a mobile device complying with the onscreen text messaging instruction and determines if the mobile carrier associated with that mobile device is supported by the mobile content delivery platform and if the requested media contextual content is supported for that mobile device. The media contextual content is then delivered to the mobile device. The text messaging instructions include a short code and an associated text message to be sent by the mobile device to the mobile content delivery platform, or other transmission method which facilitates a request from the mobile device to the mobile content delivery server. The contextual content can include a ringtone, a game, a graphic, an MP3 file or other file format for delivering music, a video file, or any combination thereof.

In another aspect of the invention, a method is provided for delivering media contextual content to a mobile device in conjunction with a search request directed to an online search engine. The search request is received by the search engine, which transmits a response to the search request, including a hyperlink to relevant media contextual content. The user then transmits a request for specific media contextual content, which is received by the mobile content delivery platform. If the mobile content delivery platform determines that the associated mobile carrier is supported, the media contextual content is delivered to the mobile device.

In another aspect of the invention, a method is provided for delivering media contextual content to a mobile device in conjunction with the serving of a web page to a user. The web page served to the user contains content (e.g., entertainment news, sports news, etc.) including a keyword hyperlink to media contextual content. The hyperlinks are displayed based on the content of the web page. The user can click on the keyword hyperlink to request specific media contextual content. The request is received at the mobile content delivery platform, which then presents a purchase information display to the user. The media contextual content is delivered to the mobile device in response to a purchase request. The keyword hyperlink can be appended to content on the served web page or can be embedded into the content on the web page. The keyword hyperlink appended to the web page can also be localized based on a user profile. The web page, including the keyword hyperlink can be served to a mobile device, a laptop computer, a desktop computer or other web-enabled device.

BRIEF DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, prominently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

In a first embodiment of the invention, contextual content is delivered to mobile devices and targeted to television programming. The contextual content can be ringtones, games, graphics, and is extensible to full-track music downloads such as MP3 files and video files, and which corresponds to the user's specific mobile device. The contextual content delivery is integrated with billing on the wireless carrier's billing statements to a user via premium SMS.

Figure 1:
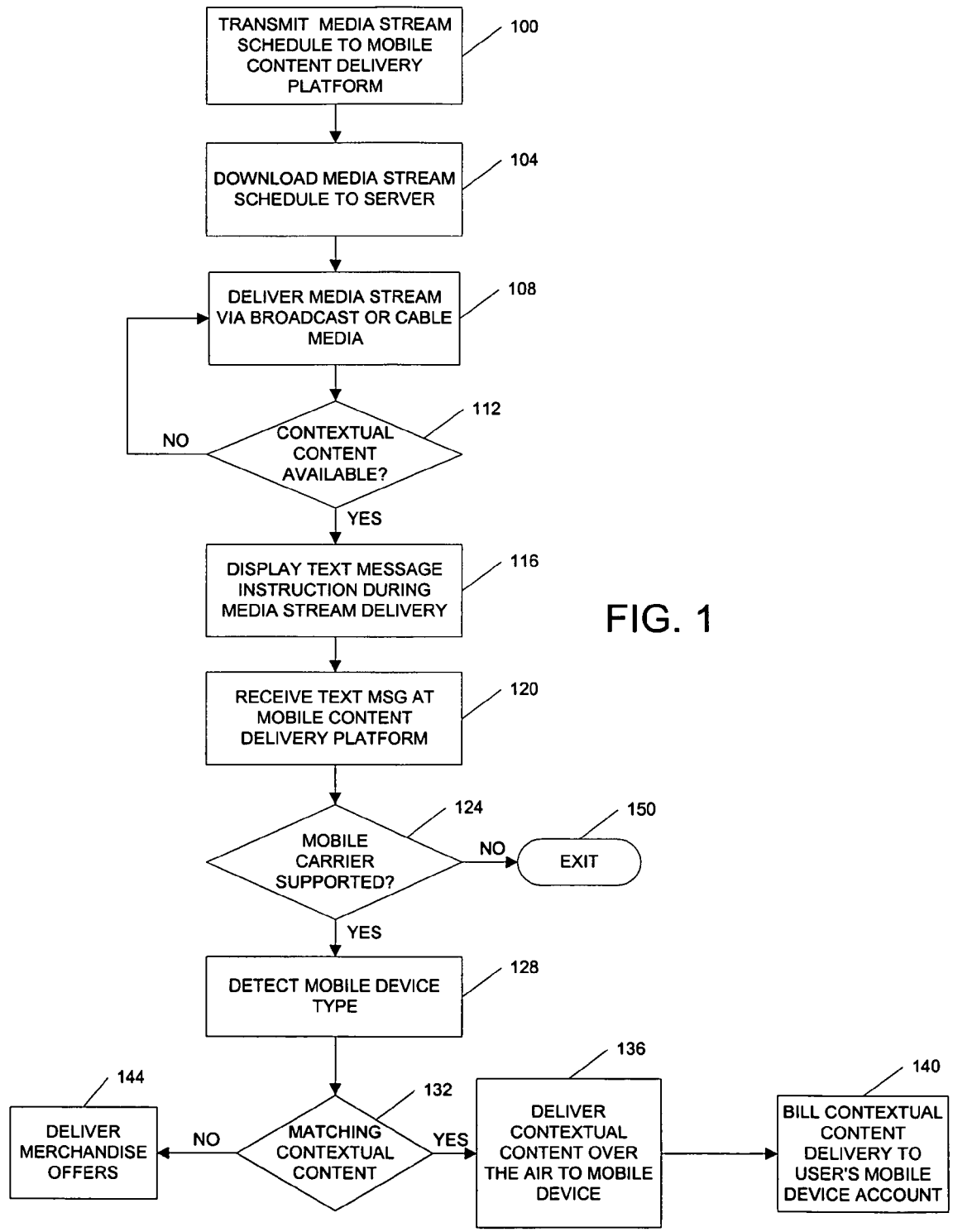
FIG. 1 illustrates the processing logic for delivering media contextual content to a mobile device during a media screen broadcast in accordance with an exemplary embodiment of the invention.

FIG. 1 illustrates the processing logic for delivering media contextual content to a mobile device during a media stream broadcast. Processing starts as indicated in logic block 100 with a broadcaster transmitting a media stream schedule to the mobile content delivery platform of the invention. A media stream broadcast can be a television network broadcast, a cable television program, or a satellite-delivered program, including music videos, sporting events, news, or any other type of broadcast programming. The media stream schedule is downloaded to the mobile content delivery platform server where a ringtone library and other mobile contextual content, such as graphics and games, are stored. According to the program schedule, the media stream is then delivered via a broadcast or cable medium to program viewers as indicated in logic block 108. The mobile content delivery platform determines if contextual content (e.g., ringtone, game, graphic) is available for any portion of the media stream (e.g., a music video) as indicated in decision block 112. If contextual content is available, then a screen popup is displayed on the screen associated with a media stream receiver providing instructions for obtaining the media content associated with the program portion as indicated in logic block 116. The text messaging instruction included in the screen pop-up includes an SMS shortcode, along with the text message to be entered by the user on the user's mobile device. If the viewer of the media stream decides to download the available media contextual content, he sends a text message to the mobile content delivery platform that complies with the instructions in the screen pop-up. The text message is received at the mobile content delivery platform as indicated in logic block 120. In decision block 124, the mobile content delivery platform determines if the mobile carrier that is used to send the text message is supported by the platform. If the user's mobile carrier is not supported, the contextual content cannot be delivered to the user's mobile device and processing exits at block 150. The mobile content delivery platform detects the mobile device type that is being used to send the text message as indicated in logic block 128. The mobile device type represents the specific manufacturer of the mobile device and a specific model. If there is a match between the mobile device type and the contextual content as determined in decision block 132, the contextual content is delivered over the air ("OTA") to the user's mobile device as indicated in logic block 136. Concurrently, the delivery of the contextual content to the user is billed to the user's mobile device account as indicated in logic block 140. In decision block 132, if it is determined that contextual content is not available for the detected mobile device type, the mobile content delivery platform delivers merchandise offers to the user based on content that is similar to the originally requested content as indicated in logic block 144.

Figure 3A:
FIGS. 3A-3B illustrate text messaging instructions displayed concurrently with a content broadcast in a screen pop-up in accordance with an exemplary embodiment of the present invention.
Figure 3B:

FIGS. 3A-3B illustrate exemplary displays presented on a media stream receiver display during broadcast of the media stream. In these exemplary displays, the media stream receiver is a television and the media stream includes music videos. FIG. 3A depicts a scene from broadcast of a music video performed by performance artist Curtis "50 Cent" Jackson on the BET network in which the pop-up indicates the instructions to obtain the ringtone associated with the music video. The shortcode to which the text message (50c1) is to be sent is also shown on the pop-up (e.g., 238 88). FIG. 3B illustrates another example of a scene from a Green Day music video broadcast on MTV with the text messaging instructions (text GD1) including the shortcode (e.g., 688 88). If the text message from the mobile device passes compatibility tests for the wireless carrier and mobile device type, the ringtone is downloaded to the mobile device and billed to the user's mobile device account.

In another embodiment of the invention, when a user conducts a search on a web-based search engine (e.g., Ask.com), such as a search for "Led Zeppelin," there is an integration with the mobile content delivery platform to search for any content relevant to Led Zeppelin. If there is a match, the search results display a link to "Get the Ask Jeeves ring tone for Led Zeppelin" or a similar link. Unlike sponsor links currently available on search engines, the present invention is targeted to "mobile" content (i.e., contextual content that can be delivered to a mobile device). In addition, unlike sponsor links currently available on search engines, the method involves integration between the search engine and the mobile content delivery platform, and the search engine receives a share of revenues from actual downloads of content to mobile devices, rather than revenues from each click on the link to content. While this embodiment involves integration into an online site instead of television, it also changes the content discovery paradigm to one that is contextual and integrated into an existing media distribution point.

Figure 2:
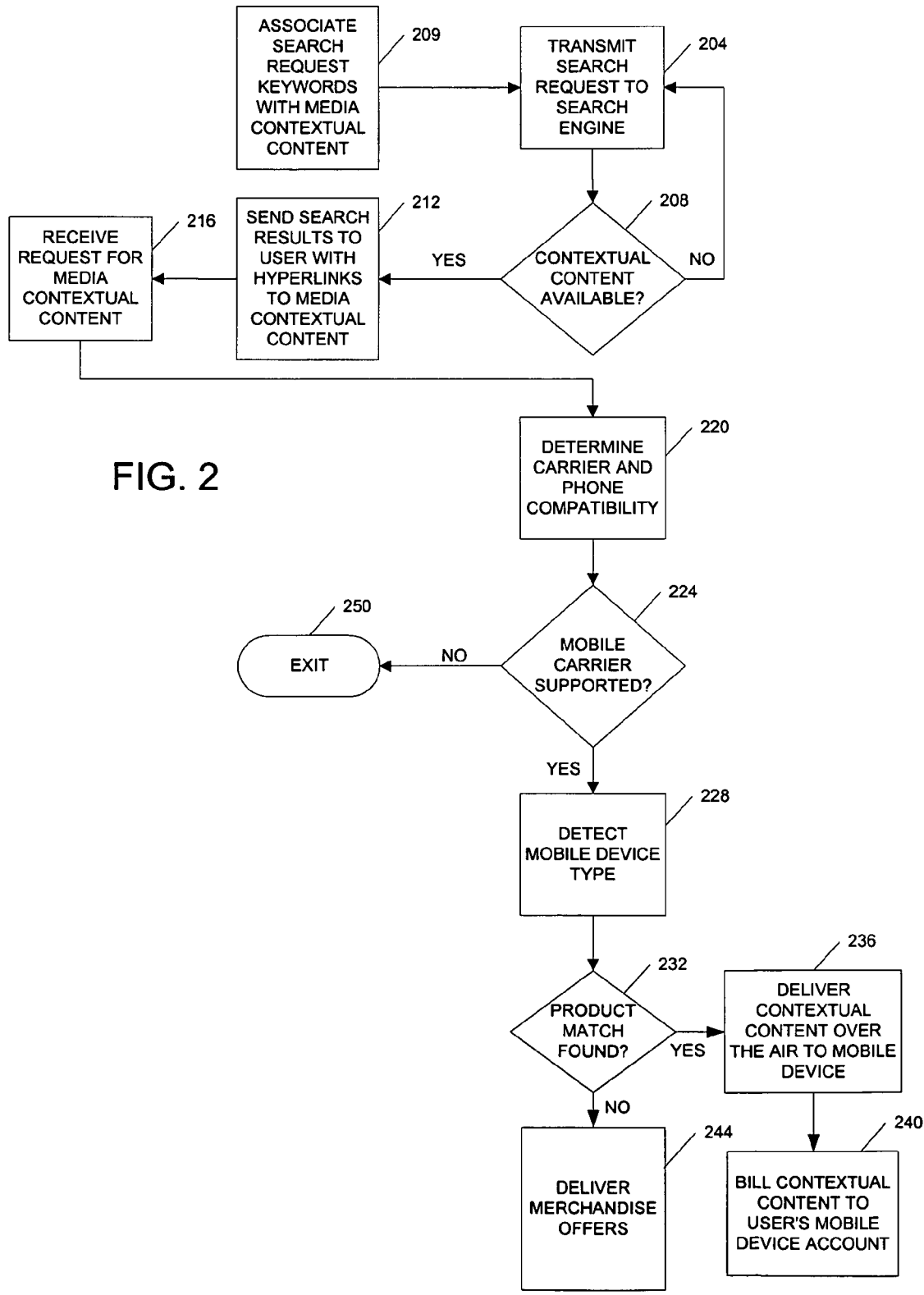
FIG. 2 illustrates the processing logic for delivering media contextual content to a mobile device in conjunction with a search request directed to an online search engine in accordance with an exemplary embodiment of the invention.

FIG. 2 illustrates the processing logic for delivering media contextual content to a mobile device in conjunction with a search request directed to an online search engine. The present invention can interoperate with any web-based search engine such as Ask Jeeves, Yahoo and Google. Processing starts in logic block 200 with the mobile content delivery platform associating search request keywords with relevant media contextual content. The association can link popular search keywords such as movie titles, entertainers, athletes, etc., with media contextual content relevant to the key words. The media contextual content can include ringtones, graphics, games, and MP3 files that are associated with the particular key words used. In logic block 204, a user transmits a search request to a search engine such as Ask Jeeves. In decision block 208, the mobile content delivery platform determines whether contextual content is available based on the keyword search request. If contextual content is available, the search engine returns search results to the user that includes hyperlinks to the media contextual content as indicated in logic block 212.

Next, as indicated in logic block 216, the mobile content delivery platform receives a request from the user for media contextual content. The mobile content delivery platform determines carrier and phone compatibility as indicated in logic block 220. In decision block 224, the mobile content delivery platform determines if the mobile carrier is supported. If the mobile carrier is not supported, the media contextual content cannot be delivered to the mobile device and processing ends as indicated in block 250. The mobile content delivery platform detects the mobile device type as indicated in logic block 228. The mobile content delivery platform then determines if the request for contextual content can be delivered to the detected mobile device type as indicated in decision block 232. If the content is found to be deliverable, the contextual content is delivered over the air to the mobile device as indicated in logic block 236. The contextual content download is concurrently billed to the user's mobile device account as indicated in logic block 240. If a product match is not found between the media contextual content and the mobile device type in decision block 232, the mobile content delivery platform delivers merchandise offers to the user as indicated in logic block 244.

Figure 4A:
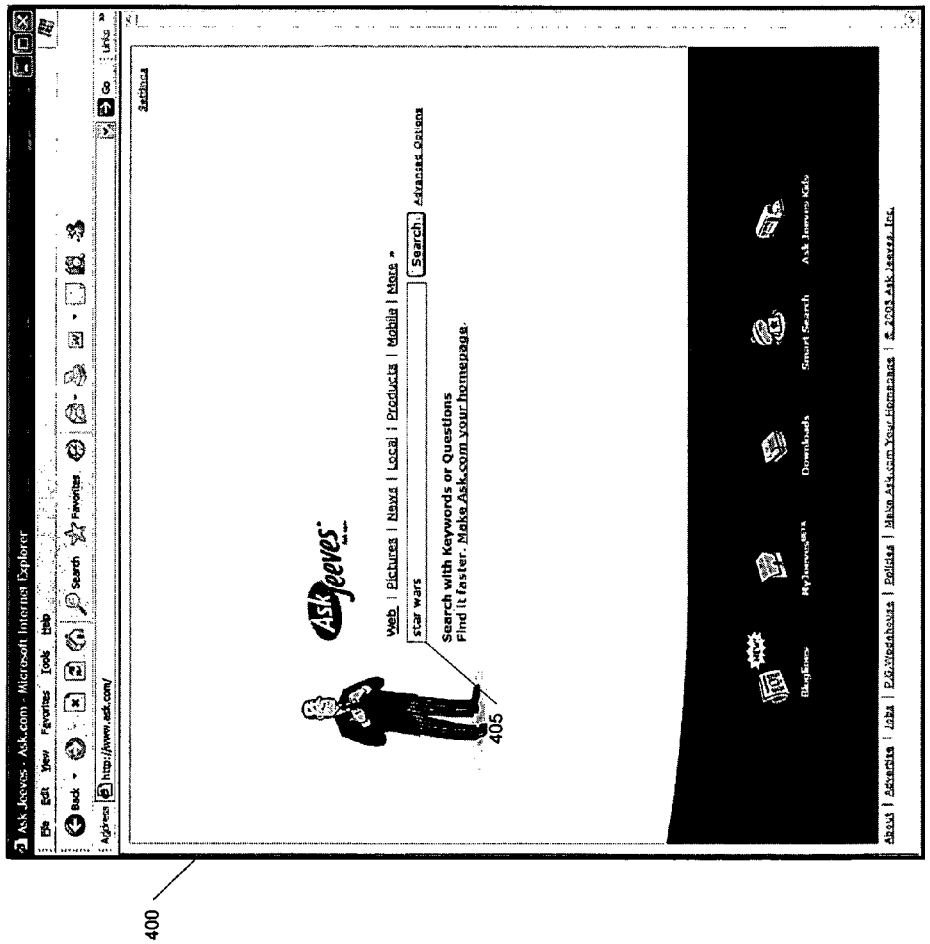
FIGS. 4A-4C illustrate exemplary displays having media contextual content hyperlinks in a response to a user's search query using a search engine.
Figure 4B:
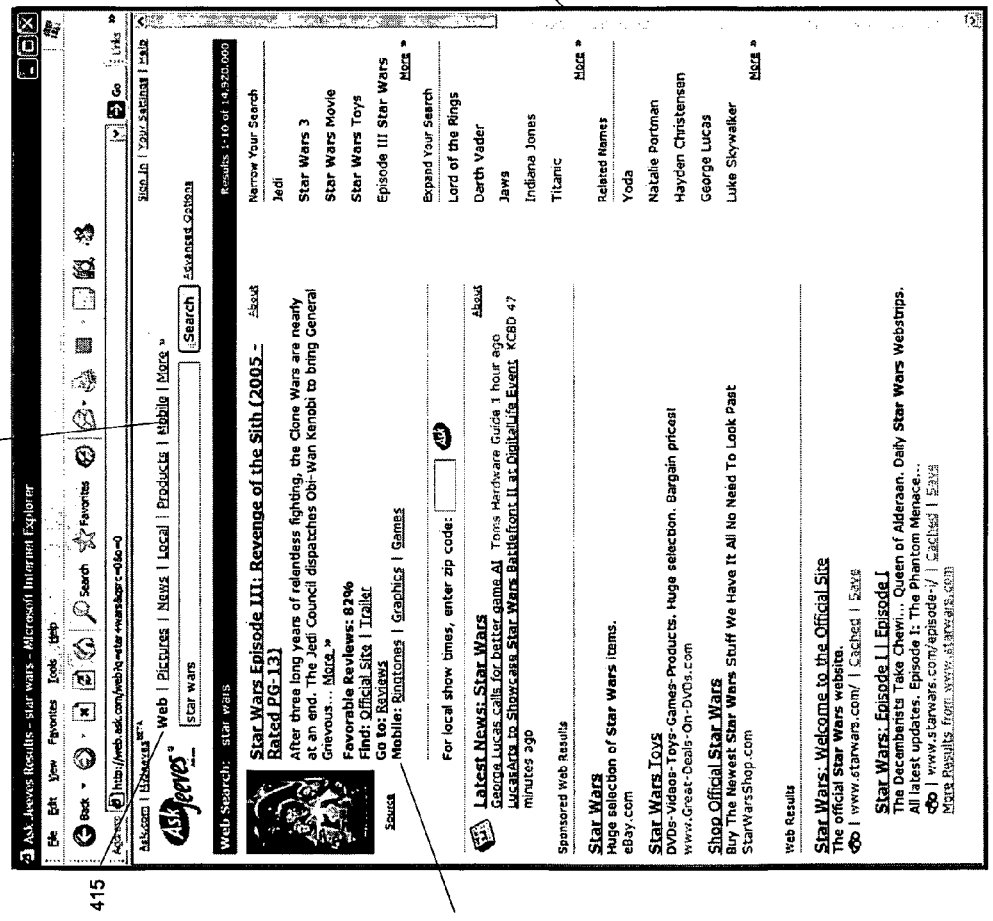
Figure 4C:
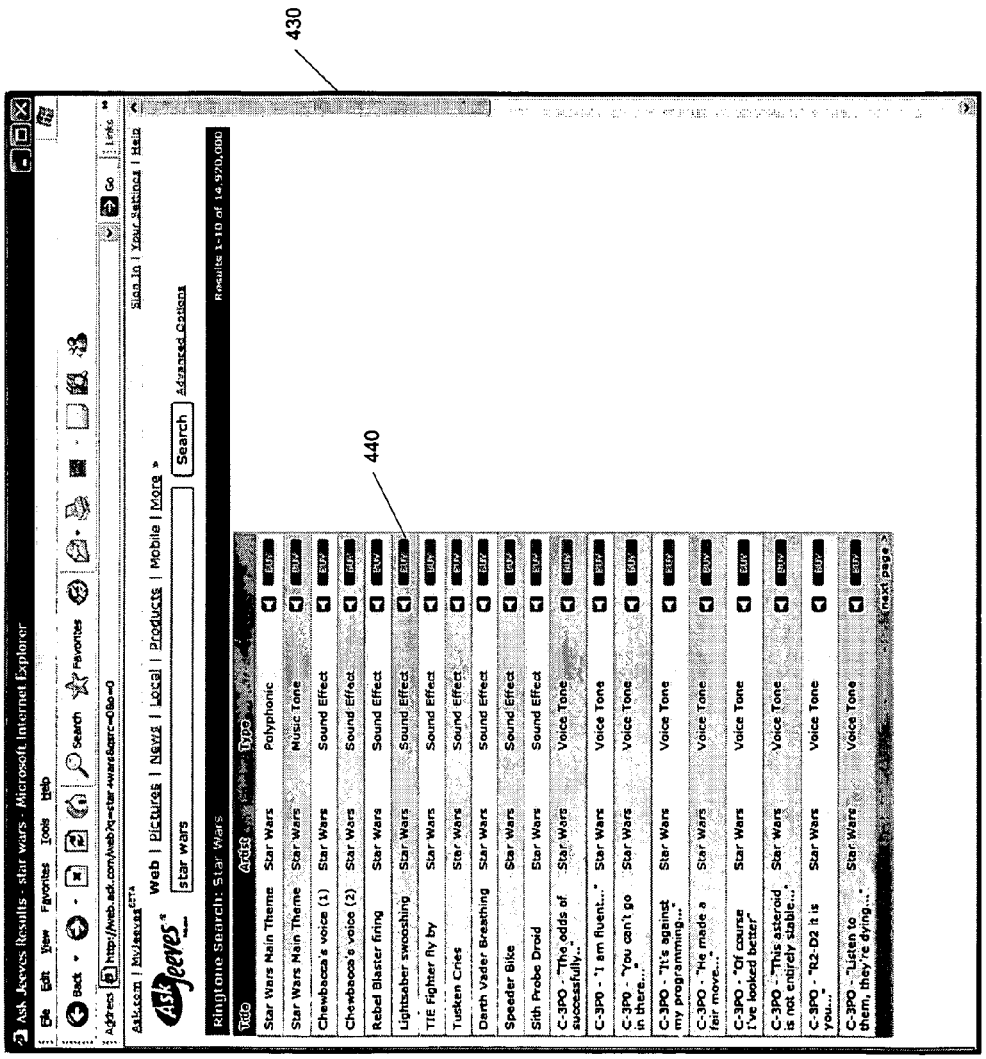

FIGS. 4A-4C illustrate exemplary windows 400, 420, 430 having media contextual content hyperlinks included in a response to a user's search query using a search engine. In window 400, depicted in FIG. 4A, a user has entered a search query for "Star Wars" in the search box 405 for the Ask.com portal. In window 410, depicted in FIG. 4B, a screen display resulting from the user's selection of a particular search result is shown. In this example, the user has selected "Star Wars Episode III." The screen display 410 is similar to the customary search result display on Ask.com, but has additional hyperlinks for ringtones, graphics and games on the line 420 labeled "Mobile." A "Mobile" link 425 has also been added to the Ask.com toolbar 415. The window 430 shown in FIG. 4C displays the results of a "mobile" ringtone search listing selections that can be downloaded to the user's mobile device. The search results 440 include various polyphonic tones, music tones, sound effects and voice tones.

Figure 5A:
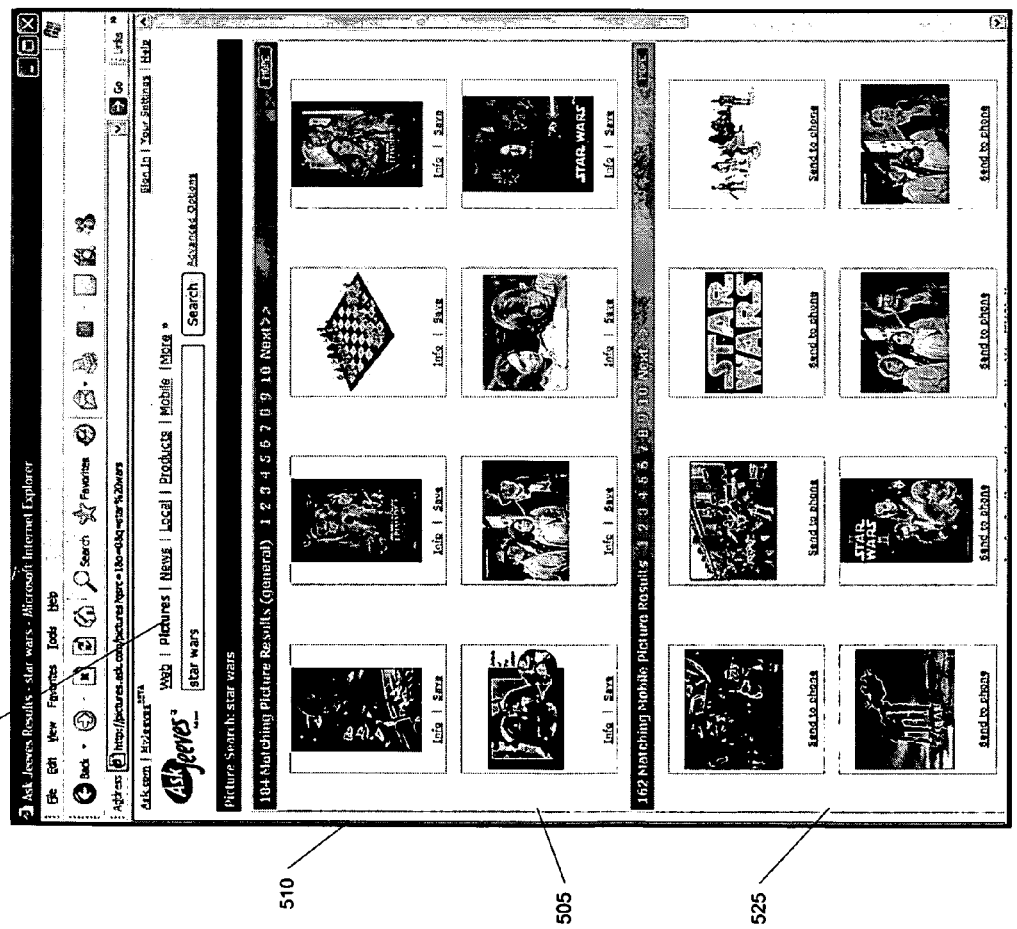
FIGS. 5A-5B illustrate exemplary screen displays of media contextual links that are associated with the user's search request.
Figure 5B:
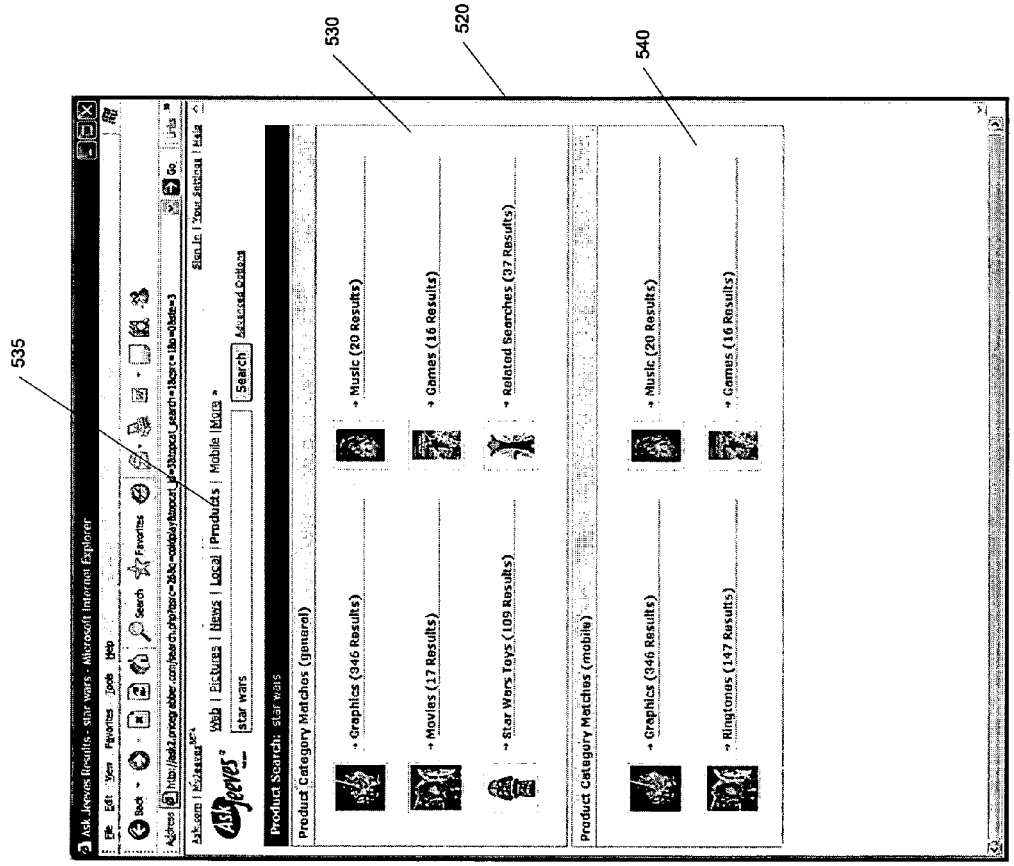

FIGS. 5A-5B illustrate exemplary windows 510, 520 having media contextual links that are associated with the user's search request. In FIG. 5A, the user has selected the "Pictures" link 515 on the Ask.com toolbar, and is presented with the display 510 showing picture results 505 and matching mobile content picture results 525 that can be downloaded to the user's mobile device. In FIG. 5B, the user has selected the "Products" link 535 on the Ask.com toolbar, and is presented with the display 520 showing various product categories (e.g., graphics, movies, toys, music, games and related searches) 530 and matching mobile content results (e.g., graphics, ringtones, music and games) 540 that can be downloaded to the user's mobile device.

Figure 6:
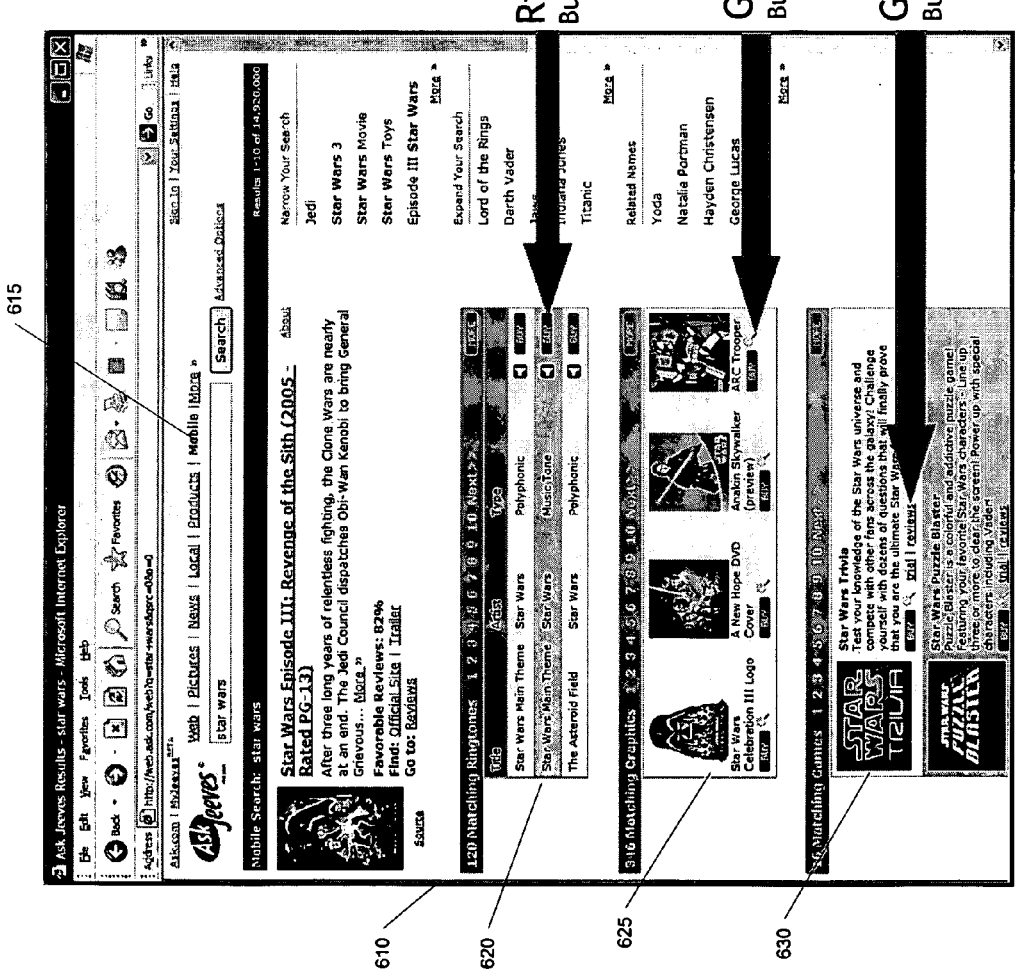
FIG. 6 illustrates an exemplary screen display for enabling a user to purchase various items of media contextual content.

FIG. 6 illustrates an exemplary display 610 for enabling a user to preview and/or purchase various items of media contextual content. The user has selected the "Mobile" link 615 on the Ask.com toolbar and is presented with the display 610 that includes matching mobile ringtones 620, mobile graphics 625 and mobile games 630 that can be downloaded to the user's mobile device.

In another embodiment of the invention, links to purchase and download "mobile" content can be displayed on web pages based on contextual relevance. The web pages can be both online/hypertext markup language (HTML), and wireless/WAP pages. The mobile content delivery platform of the present invention analyzes the content of a web page, and based on the content displayed on that page, provides a list of contextually relevant links to enable the user to purchase and download mobile contextual content. As an example, on a web page that contains a news article about a particular performance artist, the mobile content delivery platform would provide the content publisher with links to purchase ringtones or graphics or other mobile content that are associated with the performance artist.

Figure 7A:
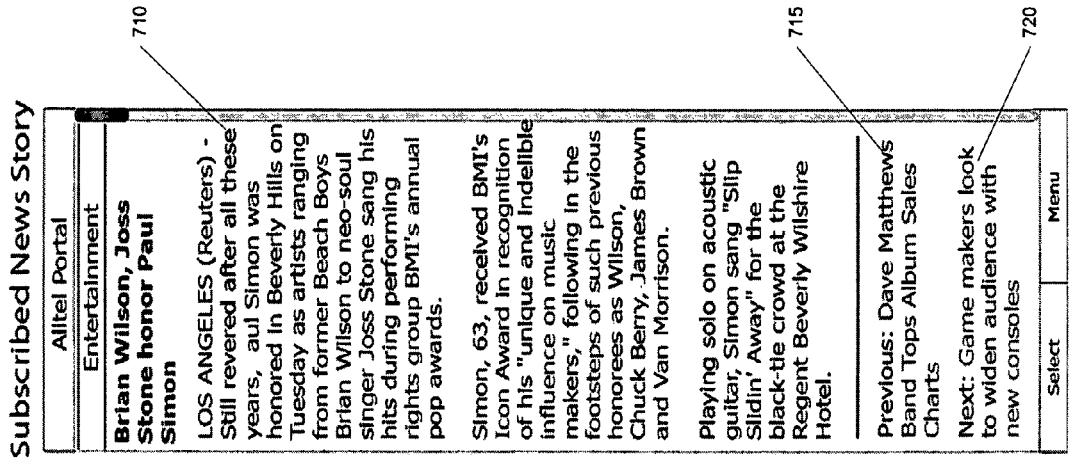
FIGS. 7A-7B illustrate exemplary displays of content on a web-enabled device in which key words representing media contextual content are attached to articles displayed on the device.
Figure 7B:
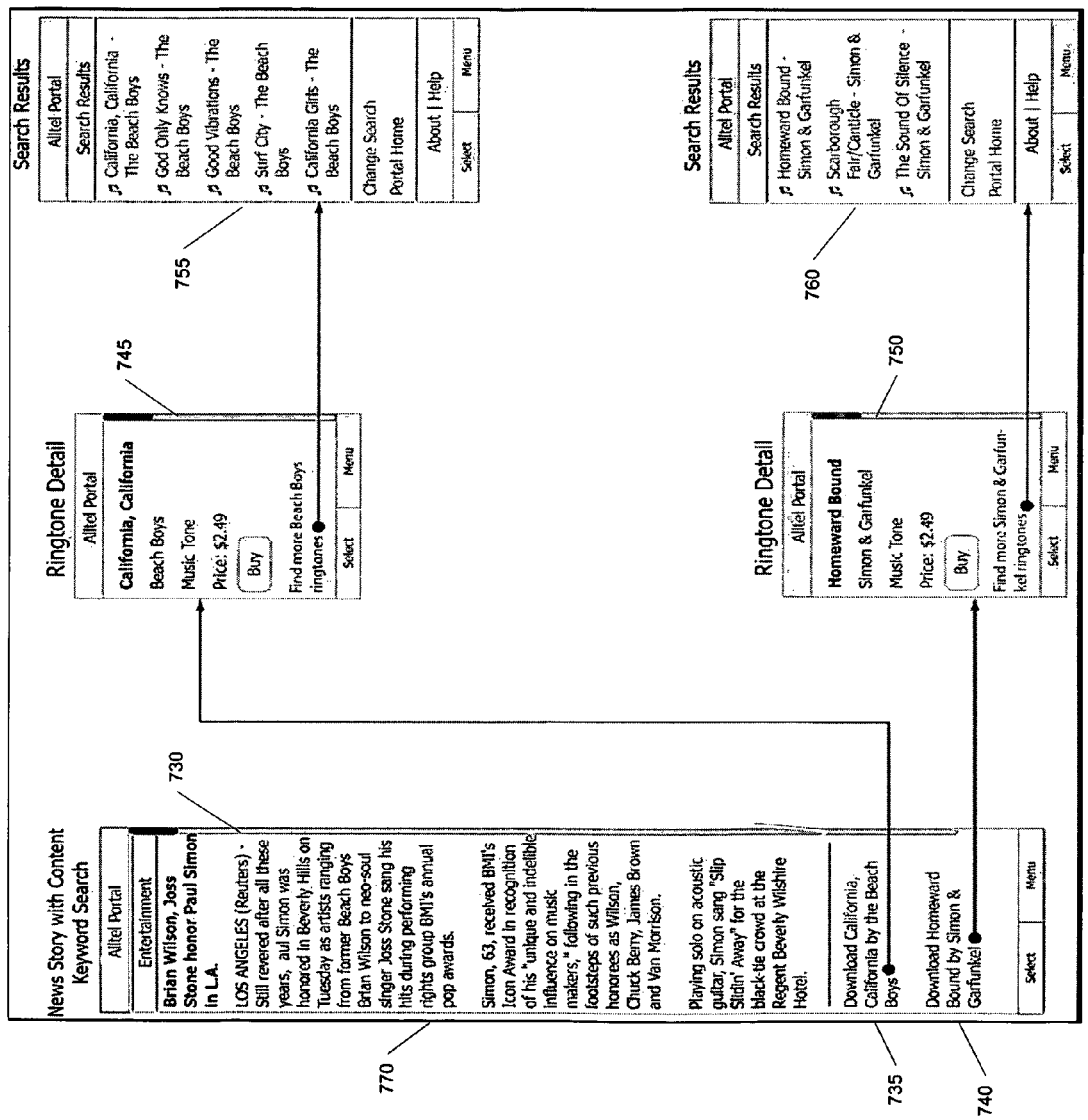

FIGS. 7A-7B illustrate exemplary displays 710, 770 of content on a web-enabled device in which keywords representing media contextual content are attached to articles displayed on the device. In FIG. 7A, an exemplary display 710 of an entertainment news article is presented to a subscriber to the Alltel portal on a mobile device using WML. Following the news article, the user has the options to view a previous article 715 or the next article 720 available on the portal. In FIG. 7B, a mobile content keyword search based on the article headline 730 results in media contextual content links 735, 740 being appended to the news article 770. The keyword content link will appear before the previous article/next article links. Selecting keyword link 735 results in media content detail display 745 (e.g., ringtone detail, including title, artist, ringtone type, price and purchase link). There is also a link to further relevant media content that results in the further display 755. Likewise, selecting keyword link 740 results in media content detail display 750 and further search results 760.

Figure 8:
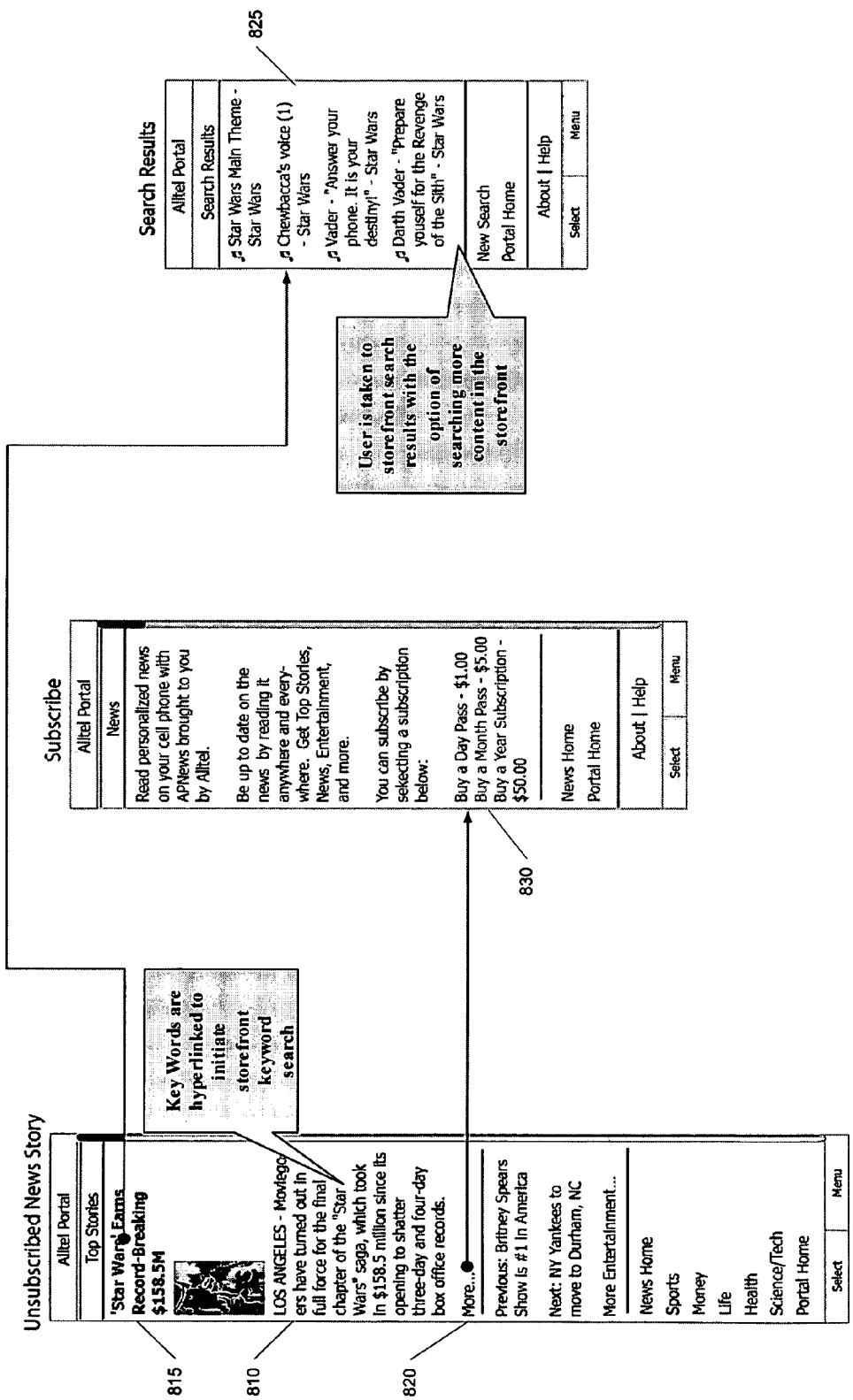
FIG. 8 illustrates an exemplary display of content on a web-enabled device in which key words representing media contextual content are embedded in the displayed content.

FIG. 8 illustrates an exemplary display of content 810 on a web-enabled device in which keywords representing media contextual content are embedded in the displayed content. In the article display 810 accessed on the Alltel portal and presented on a mobile device to a non-subscriber, the headline 815 includes a hyperlink that can be selected to access mobile content search results 825. The search results 825 include various ringtones that can be downloaded to the user's mobile device. Also shown in display 810 is a link 820 to information 830 on subscribing to news article on the Alltel portal.

Figure 9:
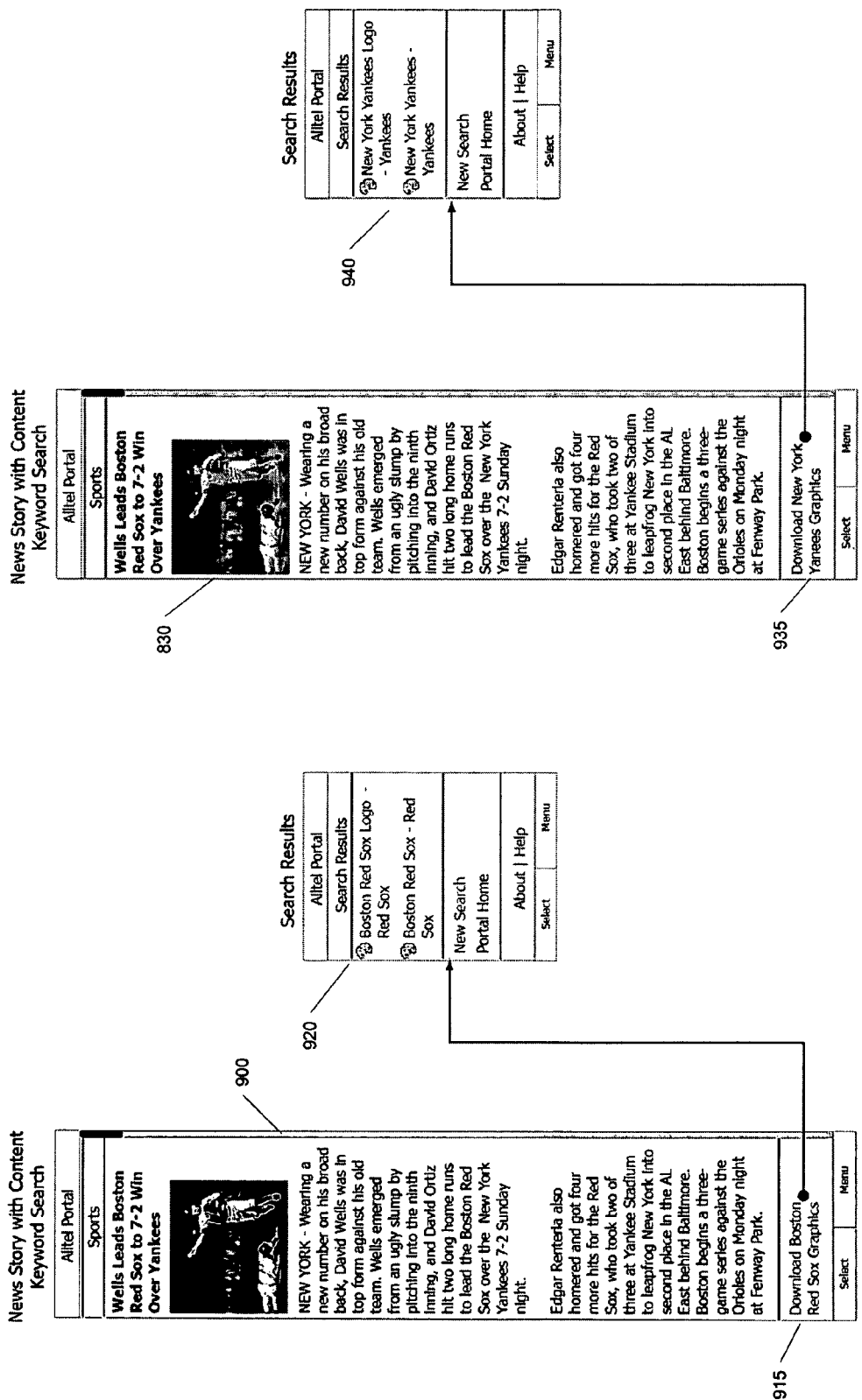
FIG. 9 illustrates an exemplary display of content delivered to a web-enabled device in which the keyword attached to the content is localized based on the user's profile.

FIG. 9 illustrate exemplary displays of content 900, 930 delivered to a web-enabled device in which the mobile content keyword link 915, 935 attached to the content is localized based on the user's profile information gathered on a web portal. For example, the sports news article 900 delivered to a New York area subscriber would have a link 915 to the mobile contextual content for the New York team that is a subject of the news article. Likewise, the same sports news article 930 delivered to a Boston area subscriber would have a link 935 to the mobile contextual content for the Boston team that is a subject of the news article. Selecting links 915 or 935, as appropriate, would results in the additional search results 920, 940, respectively.

The mobile content delivery platform of the present invention has been described as computer-implemented processes. It is important to note, however, that those skilled in the art will appreciated that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method for delivering mobile content to a mobile device during a television video media stream broadcast, comprising the steps of:
   transmitting the television video media stream to a media stream receiver;
   displaying a text messaging instruction on a media stream receiver display for requesting mobile content during transmission of the television video media stream;
   receiving an SMS text message from the mobile device complying with the text messaging instruction; and
   delivering the mobile content to the mobile device.

2. The method for delivering media contextual content of claim 1 further comprising the steps of receiving a media stream schedule at a mobile content delivery platform and downloading the media stream schedule to a server.

3. The method for delivering mobile content of claim 1 further comprising the step of determining if mobile content is available for delivery to the mobile device.

4. The method for delivering mobile content of claim 1 further comprising the steps of detecting a type associated with the mobile device and determining if mobile content is available to the mobile device type.

5. The method for delivering mobile content of claim 1 further comprising the step of billing the delivery of mobile content to a mobile device account.

6. The method for delivering mobile content of claim 1 wherein the media stream comprises a plurality of music videos.

7. The method for delivering mobile of claim 1 wherein the media stream comprises a television program.

8. The method for delivering mobile content of claim 1 wherein the text messaging instructions comprise a shortcode and an associated text message.

9. The method for delivering mobile content of claim 8 wherein the shortcode is specific to the media contextual content.

10. The method for delivering mobile content of claim 8 wherein the shortcode is specific to a media stream broadcaster.

11. The method for delivering mobile content of claim 1 wherein the text messaging instructions are displayed in a pop-up on the media stream receiver display.

12. The method for delivering mobile content of claim 1 wherein the contextual content comprises a file selected from the group consisting of:
   ringtone file, a game file, a graphic file, an MP3 file, a music file, and a video file.

13. The method for delivering mobile content of claim 1 wherein the media stream is transmitted to at least one of a television, a personal computer or handheld device.

14. The method for delivering mobile content of claim 4 wherein the step of determining if mobile content is available for delivery to the mobile device comprises determining if the associated mobile carrier is supported by the mobile content delivery platform.

15. The method for delivering mobile content of claim 4 further comprising the step of delivering merchandise offers to the mobile device.

16. A computerized system for delivering mobile content to a mobile device during a television video media stream broadcast, comprising:
   a processor;
   at least one memory storage device comprising a non-transitory computer-readable medium;
   a connection to a telecommunications network configured to receive an SMS text message;
   a database recorded on one of the memory storage devices including a library of mobile content;
   a mobile content delivery platform comprising a program recorded on one of the memory storage devices, said program including:
      a module for displaying a text messaging instruction on a media stream receiver for delivering mobile content to a mobile device during transmission of the television video media stream;
      a module for receiving an SMS text message from the mobile device complying with the text messaging instructions; and a module for delivering the mobile content to the mobile device.

17. The system for delivering mobile content of claim 16 wherein the mobile content delivery platform further comprises a module for receiving a media stream schedule from a media stream broadcaster.

18. The system for delivering mobile content of claim 16 wherein the mobile content delivery platform further comprises a module for determining if mobile content corresponding to the media stream is available for delivery to the mobile device.

19. The system for delivering mobile content of claim 16 wherein the mobile content delivery platform further comprises a module for detecting a type associated with the mobile device and determining if mobile content is available to the mobile device type.

20. The system for delivering mobile content of claim 16 wherein the mobile content delivery platform further comprises a module for billing the delivery of mobile content to a mobile device account.

21. The system for delivering mobile content of claim 16 wherein the media stream comprises a plurality of music videos.

22. The system for delivering mobile content of claim 16 wherein the media stream comprises a television program.

23. The system for delivering mobile content of claim 16 wherein the text messaging instruction comprises a shortcode and an associated text message.

24. The system for delivering mobile content of claim 23 wherein the shortcode is specific to the mobile content.

25. The system for delivering mobile content of claim 23 wherein the shortcode is specific to a media stream broadcaster.

26. The system for delivering mobile content of claim 16 wherein the text messaging instructions are displayed in a pop-up on the media stream receiver display.

27. The system for delivering mobile content of claim 16 wherein the library of mobile content comprises a file selected from the group consisting of: a ringtone file, a game file, a graphic file, an MP3 file, a music file, and a video file.

28. The system for delivering mobile content of claim 16 wherein the media stream is transmitted to a device selected from the group consisting of a television, a personal computer or and a handheld device.

29. The system for delivering mobile content of claim 19 wherein the module for determining if mobile content is available for delivery to the mobile device type comprises a sub-module for determining if the associated mobile carrier is supported by the mobile content delivery platform.

30. A memory storage device comprising a non-transitory computer-readable medium, which, when read by a computer, is capable of causing the computer to execute the method of claim 1.

* * * * *